(12) United States Patent
Salgado

(10) Patent No.: US 8,836,995 B2
(45) Date of Patent: Sep. 16, 2014

(54) METHOD AND APPARATUS FOR REPLACING BANNER PAGES WITH DOCUMENT IDENTIFICATION INFORMATION IN AN IMAGE PRODUCTION DEVICE

(75) Inventor: David Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 694 days.

(21) Appl. No.: 12/837,050

(22) Filed: Jul. 15, 2010

(65) Prior Publication Data

US 2012/0013921 A1    Jan. 19, 2012

(51) Int. Cl.
*H04N 1/60* (2006.01)
*G06F 3/12* (2006.01)

(52) U.S. Cl.
CPC ............ *G06F 3/1253* (2013.01); *G06F 3/1242* (2013.01); *G06F 3/1205* (2013.01); *G06F 3/1219* (2013.01)
USPC .......................................... 358/1.9; 358/1.18

(58) Field of Classification Search
USPC ................................................ 358/1.1–3.29
See application file for complete search history.

(56) References Cited

U.S. PATENT DOCUMENTS

| | | | | |
|---|---|---|---|---|
| 5,559,933 A | * | 9/1996 | Boswell | 358/1.15 |
| 2007/0177207 A1 | * | 8/2007 | Ahmad | 358/1.18 |
| 2008/0112015 A1 | * | 5/2008 | Liu | 358/402 |

* cited by examiner

*Primary Examiner* — Benny Q Tieu
*Assistant Examiner* — Marcellus Augustin
(74) *Attorney, Agent, or Firm* — Ronald E. Prass, Jr.; Prass LLP

(57) ABSTRACT

A method and apparatus for replacing banner pages with document identification information in an image production device is disclosed. The method may include receiving a request from a user to cease including a banner page with each printed document, the banner page being separate page containing document identification information, prompting the user to enter document identification information to be printed on the document, receiving the document identification information from the user, receiving a request from the user to print a document, and printing the document with document identification information on one or more pages of the document.

15 Claims, 4 Drawing Sheets

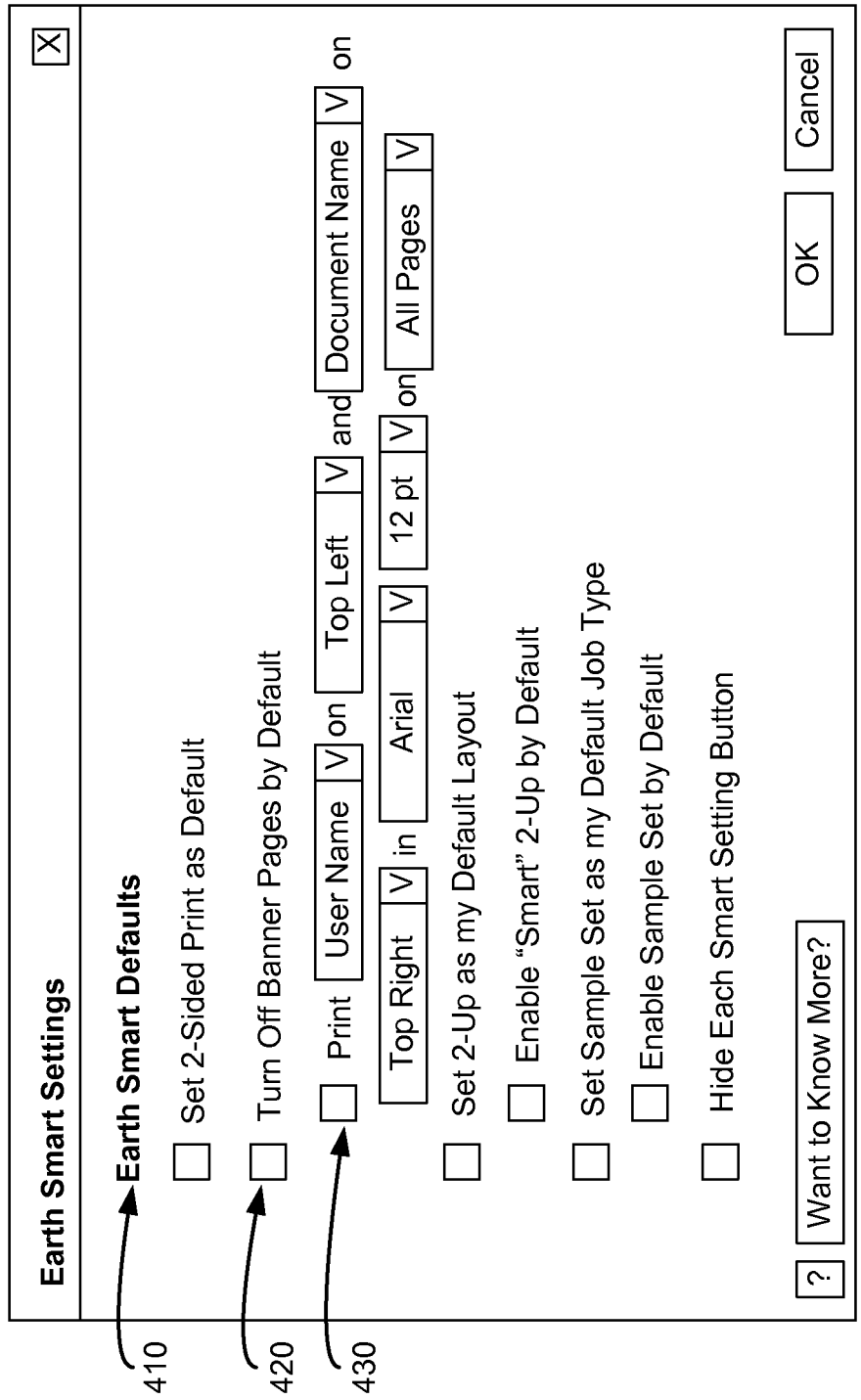

METHOD AND APPARATUS FOR REPLACING BANNER PAGES WITH DOCUMENT IDENTIFICATION INFORMATION IN AN IMAGE PRODUCTION DEVICE

BACKGROUND

Disclosed herein is a method for replacing banner pages with document identification information in an image production device, as well as corresponding apparatus and computer-readable medium.

Green printing has become an area of product differentiation in the printing marketplace. One particular green printing approach is for users to disable banner pages. Banner pages are document separator pages that accompany a printed document that contain document identification information so that a user may find his or her printed document amongst several printed documents on a shared image production device, for example. However, without banner pages in an enterprise environment, a user's print job cannot be easily found and differentiated. As such, users have been very reluctant to enter print jobs without printing the accompanying banner page.

SUMMARY

A method and apparatus for replacing banner pages with document identification information in an image production device is disclosed. The method may include receiving a request from a user to cease including a banner page with each printed document, the banner page being separate page containing document identification information, prompting the user to enter document identification information to be printed on the document, receiving the document identification information from the user, receiving a request from the user to print a document, and printing the document with document identification information on one or more pages of the document.

BRIEF DESCRIPTION OF THE DRAWINGS

FIG. 4 is an exemplary print driver user interface for disabling banner pages and entering document identification information in accordance with one possible embodiment of the disclosure.

DETAILED DESCRIPTION

Figure 1:
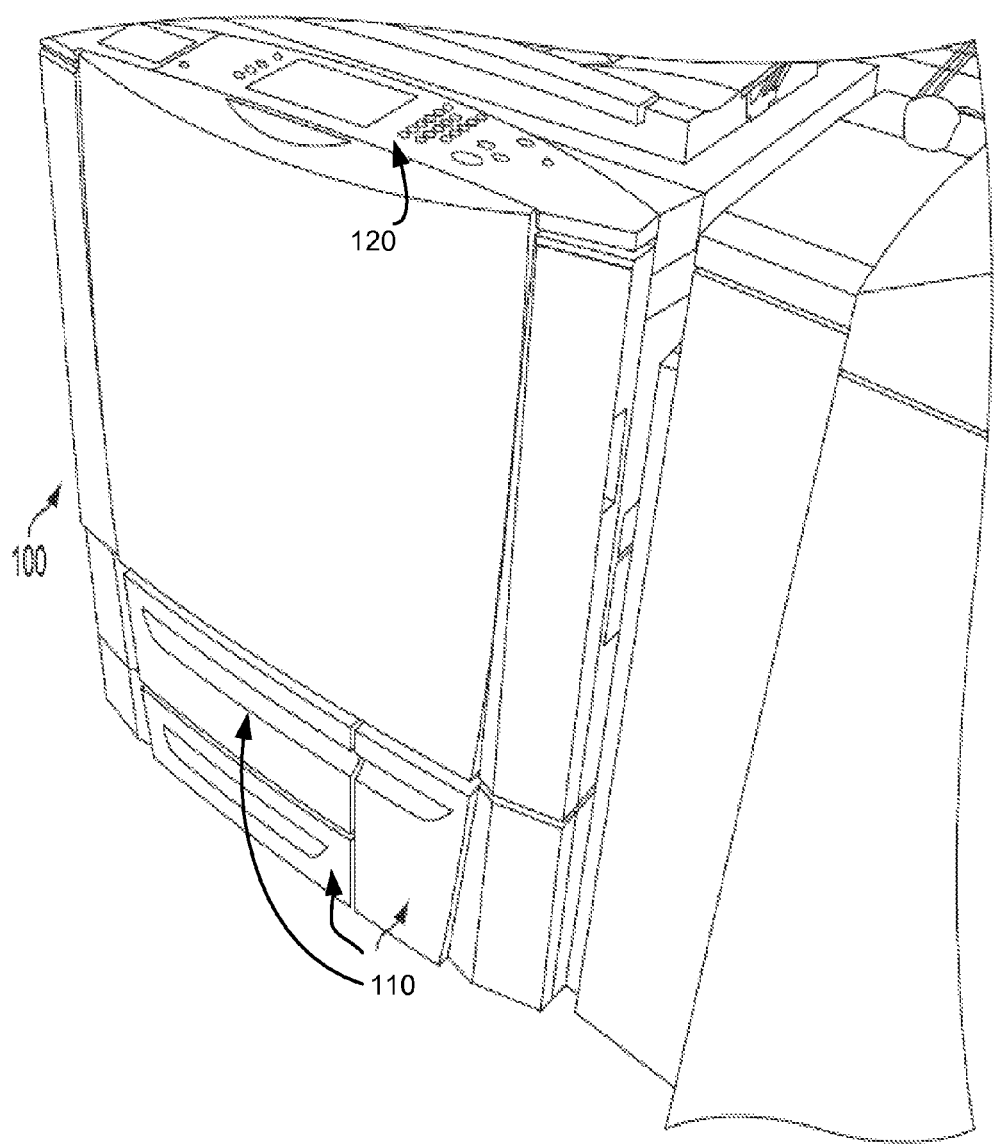
FIG. 1 is an exemplary diagram of an image production device in accordance with one possible embodiment of the disclosure.

Aspects of the embodiments disclosed herein relate to a method for replacing banner pages with document identification information in an image production device, as well as corresponding apparatus and computer-readable medium.

The disclosed embodiments may include a method for replacing banner pages with document identification information in an image production device. The method may include receiving a request from a user to cease including a banner page with each printed document, the banner page being separate page containing document identification information, prompting the user to enter document identification information to be printed on the document, receiving the document identification information from the user, receiving a request from the user to print a document, and printing the document with document identification information on one or more pages of the document.

The disclosed embodiments may further include an image production device that may include a document identification unit that receives a request from a user to cease including a banner page with each printed document, the banner page being separate page containing document identification information, prompts the user to enter document identification information to be printed on the document, receives the document identification information from the user, and an image production section that receives a request from the user to print a document, and prints the document with document identification information on one or more pages of the document.

The disclosed embodiments may include a computer-readable medium storing instructions for controlling a computing device for replacing banner pages with document identification information in an image production device. The instructions may include receiving a request from a user to cease including a banner page with each printed document, the banner page being separate page containing document identification information, prompting the user to enter document identification information to be printed on the document, receiving the document identification information from the user, receiving a request from the user to print a document, and printing the document with document identification information on one or more pages of the document.

The disclosed embodiments may propose to replace banner pages with document identification information in image production devices. In this manner, the disclosed embodiments may provide a simple intuitive process for a user to specify the printer driver should annotate identification information to the printed job when the user has chosen to disable banner pages. Identification information may include the user's name and the document's name, for example. The process may enable a user to find their printed job at the image production device when his/her job resides within a stack of printed jobs.

In one possible embodiment, when the user disables the banner page option in the printer driver, the print driver may present the option for the user to annotate identification information in a simple sentential structure. Within the sentential structure, the user may have the options to specify 1-2 types of identification to be added (e.g. user name, document name, custom text), location of the information (top left, top center, top right, bottom left, bottom center, bottom right), the font, font size, and whether to add it to all pages or the first page only, for example.

Using the drop down boxes in the sentence structure, the user may simply and quickly specify what information to place on the job's pages when there isn't a banner page. The user may specify a "blank" (no entry) for the information element whereby "blank" may indicate that no element should be placed.

The disclosed embodiments may tie the ability to specify the annotation of a user name and/or document name directly to the printer driver's control for disabling a banner page. As such, it is clear to the user that he or she may have a viable option for identifying the printed job. Using a sentence structure with drop downs may make it very easy for the user to specify what pieces of information to annotate and where to place them.

When executing the print request, the print driver may obtain the default identification elements from the operating system for a particular user (e.g., currently logged in user for "User Name" and the requested document for the "Document Name") and add it to the specified job pages in the requested position and font for that particular user. All information may be placed in the foreground to ensure it will be shown, for example.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media tray doors 110 and a local user interface 120. The one or more media tray doors 110 may provide access to one or more media trays that contain media. The one or more media tray doors 110 may be opened by a user so that media may be checked, replaced, or to investigate a media misfeed or jam, for example.

The user interface 120 may contain one or more display screens (which may be a touchscreen or simply a display), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network.

Figure 2:
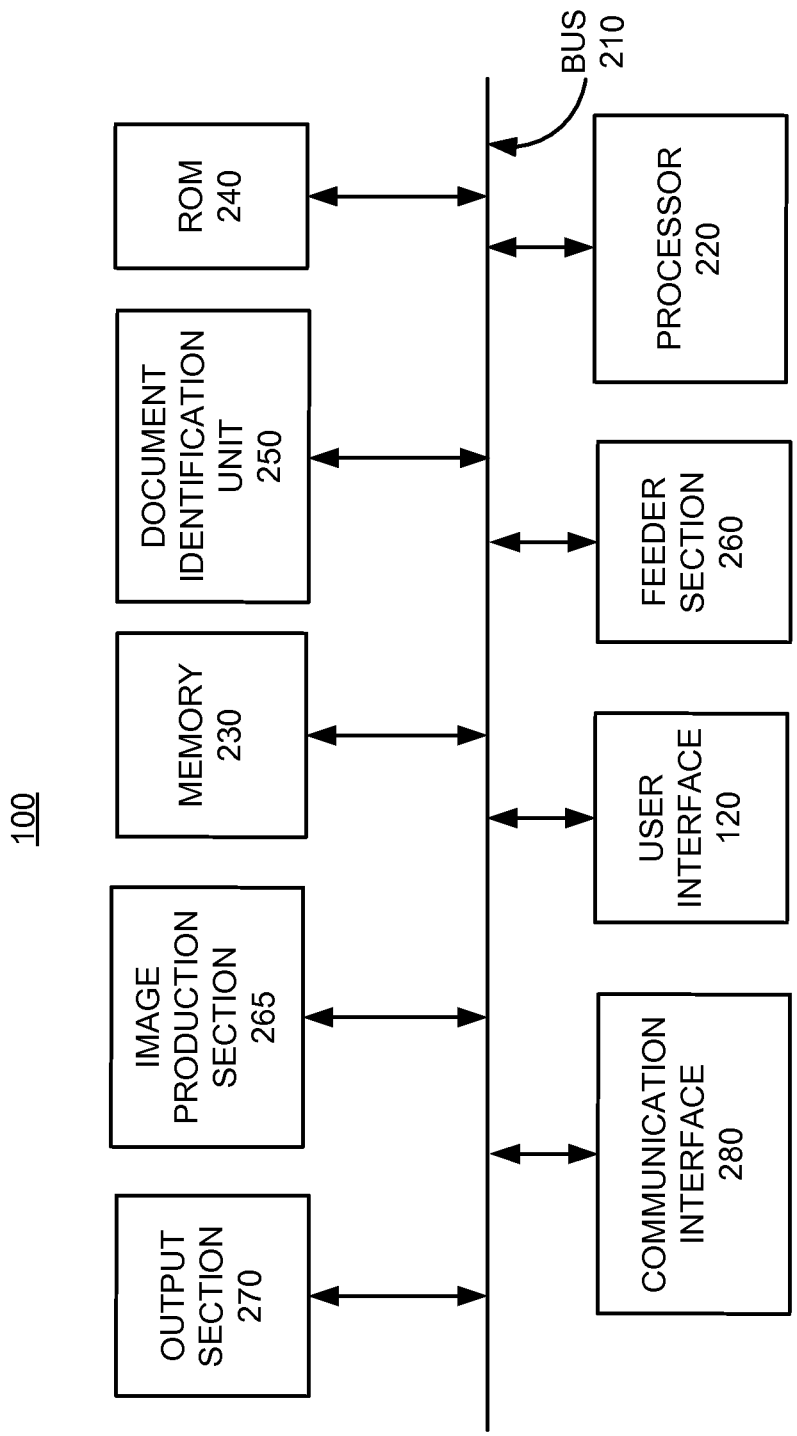
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a document identification unit 250, a feeder section 260, an output section 270, a user interface 120, a communication interface 280, and an image production section 265. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

The image production section 265 may include hardware to produce image on media and may include an image printing and/or copying section, a scanner, a fuser, etc., for example. The stand-alone feeder section 260 may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The media trays may be accessed by a user by opening the one or more media tray doors 110. The one or more media tray door sensors may sense if one or more media tray door 110 is either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

User interface 120 may include one or more conventional mechanisms that permit a user to input information to and interact with the image production unit 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The operation of the document identification unit 250 will be discussed below in relation to the flowchart in FIG. 3.

Figure 3:
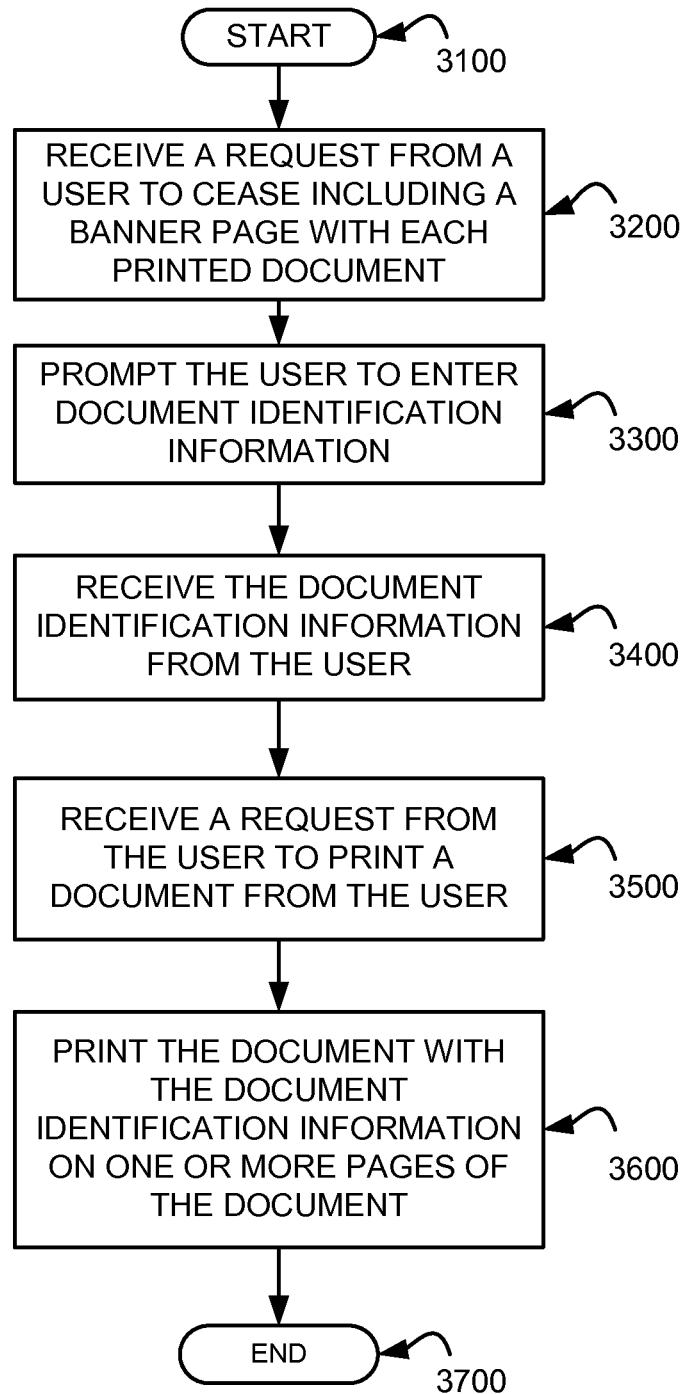
FIG. 3 is a flowchart of an exemplary document identification information process in accordance with one possible embodiment of the disclosure.

FIG. 3 is a flowchart of an exemplary document identification information process in accordance with one possible embodiment of the disclosure. The process may begin at step 3100 and may continue to step 3200 where the document identification unit 250 may receive a request from a user to cease including a banner page with each printed document. The banner page may be a document separator page containing document identification information, for example. Note that the operations of the document identification unit 250 may be embodied within or work in conjunction with the printer driver that may facilitate communications between the image production device 100 and a processing device.

At step 3300, the document identification unit 250 may prompt the user to enter document identification information to be printed on the document. The document identification information may include the user's name, the document name, the document file name, the user's identification code, the user's user name, or custom text (a user may enter any document identification information he or she wishes), for example. A print driver user interface may be presented to the user to enter in the document identification information. The print driver user interface may include pull-down menus, check boxes, and/or boxes for receiving typed entries, for example.

At step 3400, the document identification unit 250 may receive the document identification information from the user. The received document identification information may be used as default document identification information, and the document identification unit 250 may store the received default document identification information in the memory 230, for example.

At step 3500, the image production section 265 may receive a request from the user to print a document. At step 3600, the image production section 265 may print the document with document identification information on one or more pages of the document. The process may then go to step 3700 and end.

The document identification unit 250 may also receive instructions from the user that identifies the particular pages of the document on which to place the document identification information. The image production section 265 may then print the document with document identification information on the identified pages of the document.

In addition, the document identification unit 250 may receive instructions from the user as to where on the document page to place the document identification information. The image production section 265 may the print the document with document identification information on one or more pages of the document in the place indicated by the received instructions.

FIG. 4 is an exemplary print driver user interface 400 for disabling banner pages and entering document identification information in accordance with one possible embodiment of the disclosure. The exemplary print driver user interface 400 is titled "Earth Smart Settings" as an example but the user interface 400 may have any title, headings, etc. known those of skill in the art as long as banner pages may be turned off and document identification information may be entered. Note also that the document identification does not have to be default information and can be used or not used for each print job. In other words, a user may decide to only use document identification information on certain documents and leave others documents to be printed without identification information.

The exemplary print driver user interface 400 may include check boxes, pull down menus, boxes for entry of text, or the use of any other known interface entry process for the entry of user name and document name information.

Under "Earth Smart Defaults" 410 the user may select to turn off banner pages at the block 420. At block 430, the user is prompted to input identification information to be printed on the documents. The input or entry of document identification information may be performed by a selection from a menu (e.g., a pull-down menu) or by the user typing an entry, for example. For example, the user may opt to print a user name by inputting the user name (e.g., which may be the user's name, user's ID, user's office code, user's abbreviated name, etc.), input the position of the user's name (e.g., top left, top right, top center, bottom left, bottom right, bottom center, etc.), print the document name (e.g., title of document, name of document file, etc.), input the position of the document name (e.g., top left, top right, top center, bottom left, bottom right, bottom center, etc.), input the font style and size to be used for the printed user's name and/or the document name (e.g., Arial, 12 pt is shown as the example), and identify on what pages the document identification is to appear (e.g., all pages, first page, last page, etc.).

If the user decides only to print just the user name or just the document name, one of the two respective blocks (user name or document name) may be left with no entry (blank). In addition, boxes may be provided to enter in custom text.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for replacing banner pages with document identification information in an image production device, comprising:

receiving a request from a user to cease including a banner page with each printed document, the banner page being a separate page from a document containing document identification information;

prompting the user to enter separate and printable document identification information to be printed on a plurality of pages of the document in reply to the request to cease including the banner page;

receiving a user input of the separate document identification information from the user responding to the prompting;

receiving additional instructions from the user that identify which of the plurality of pages of the document on which to place the separate document identification information;

receiving further additional instructions from the user as to where on the identified plurality of pages of the document to place the separate document identification information;

receiving a request from the user to print a document containing the separate document identification information; and printing the document with the received separate document identification information on the plurality of pages of the document identified by the received addition instructions and in the place indicated by the received further additional instructions.

2. The method of claim 1, wherein the received separate document identification information is used as default document identification information, the method further comprising:

storing the received separate document identification information as the default document identification information in a memory.

3. The method of claim 1, wherein the separate document identification information is at least one of a user name, a document name, a document file name, a user identification code, and a custom text.

4. The method of claim 1, wherein the separate document identification information is entered on a print driver user interface, the print driver user interface including at least one of pull-down menus, check boxes, and boxes for receiving typed entries.

5. The method of claim 1, wherein the image production device is one of a copier, a printer, a facsimile device, and a multi-function device.

6. An image production device, comprising:
a document identification unit that is programmed to
receive a request from a user to cease including a banner page with each printed document, the banner page being a separate page from a document containing document identification information, prompt the user to enter separate and printable document identification information to be printed on a plurality of pages of the document in reply to the request to cease including the banner page, receive a user input of the separate document identification information from the user responding to the prompt;

receive additional instructions from the user that identify which of the plurality of pages of the document on which to place the separate document identification information; and receive further additional instructions from the user as to where on the identified plurality of pages of the document to place the separate document identification information; and an image production section that
receives a request from the user to print a document containing the separate document identification information, and prints the document with the received separate document identification information on the plurality of pages of the document identified by the received addition instructions and in the place indicated by the received further additional instructions.

7. The image production device of claim 6, further comprising:
a memory,
wherein the received separate document identification information is used as default document identification information, and the document identification unit is further programmed to store the received separate document identification information as the default document identification information in the memory.

8. The image production device of claim 6, wherein the separate document identification information is at least one of a user name, a document name, a document file name, a user identification code, and a custom text.

9. The image production device of claim 6, further comprising:
a print driver user interface that is presented to the user and that includes at least one of pull-down menus, check boxes, and boxes for receiving typed entries,
wherein the separate document identification information is entered on the print driver user interface.

10. The image production device of claim 6, wherein the image production device is one of a copier, a printer, a facsimile device, and a multi-function device.

11. A non-transitory computer-readable medium storing instructions that, when executed by a computing device, cause the computing device to execute a method that replaces banner pages with separate document identification information in an image production device, the method comprising:

receiving a request from a user to cease including a banner page with each printed document, the banner page being a separate page containing document identification information;

prompting the user to enter separate and printable document identification information to be printed on a plurality of pages of the document in reply to the request to cease including the banner page;

receiving a user input of the separate document identification information from the user responding to the prompting;

receiving additional instructions from the user that identify which of the plurality of pages of the document on which to place the separate document identification information;

receiving further additional instructions from the user as to where on the identified plurality of pages of the document to place the separate document identification information;

receiving a request from the user to print a document containing the separate document identification information; and printing the document with the received separate document identification information on the plurality of pages of the document identified by the received addition instructions and in the place indicated by the received further additional instructions.

12. The non-transitory computer-readable medium of claim 11, wherein the received separate document identification information is used as default document identification information, the method further comprising:

storing the received separate document identification information as the default document identification information in a memory.

13. The non-transitory computer-readable medium of claim 11, wherein the separate document identification information is at least one of a user name, a document name, a document file name, a user identification code, and a custom text.

14. The non-transitory computer-readable medium of claim 11, wherein the separate document identification information is entered on a print driver user interface, the print driver user interface including at least one of pull-down menus, check boxes, and boxes for receiving typed entries.

15. The non-transitory computer-readable medium of claim 11, wherein the image production device is one of a copier, a printer, a facsimile device, and a multi-function device.

* * * * *